US009822278B2

(12) United States Patent
Yano et al.

(10) Patent No.: US 9,822,278 B2
(45) Date of Patent: Nov. 21, 2017

(54) ONE-COMPONENT TYPE POLYURETHANE RESIN COMPOSITION FOR PREVENTING DETACHMENT OF CONCRETE PIECES AND TILES AND METHOD FOR PREVENTING DETACHMENT OF CONCRETE PIECES AND TILES USING SAME

(71) Applicants: DYFLEX CORPORATION, Tokyo (JP); AUTO CHEMICAL INDUSTRY CO., LTD., Tokyo (JP)

(72) Inventors: Noriyoshi Yano, Funabashi-chi (JP); Tsuyoshi Takeda, Funabashi (JP); Koji Sato, Kasumigaura (JP); Megumi Yaoita, Kasumigaura (JP)

(73) Assignees: DYFLEX CORPORATION, Tokyo (JP); AUTO CHEMICAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 13/692,771

(22) Filed: Dec. 3, 2012

(65) Prior Publication Data
US 2013/0101744 A1 Apr. 25, 2013

Related U.S. Application Data

(63) Continuation of application No. PCT/JP2011/062590, filed on Jun. 1, 2011.

(30) Foreign Application Priority Data

Jun. 1, 2010 (JP) .................................. 2010-125657

(51) Int. Cl.
| | |
|---|---|
| *C09D 175/04* | (2006.01) |
| *C04B 28/02* | (2006.01) |
| *B05D 1/38* | (2006.01) |
| *B05D 5/10* | (2006.01) |
| *B05D 1/36* | (2006.01) |
| *B05D 7/24* | (2006.01) |
| *C04B 41/00* | (2006.01) |
| *C04B 41/48* | (2006.01) |
| *C04B 41/63* | (2006.01) |
| *E04F 13/02* | (2006.01) |
| *C04B 111/00* | (2006.01) |
| *C04B 111/72* | (2006.01) |

(52) U.S. Cl.
CPC ............. *C09D 175/04* (2013.01); *B05D 1/36* (2013.01); *B05D 1/38* (2013.01); *B05D 5/10* (2013.01); *B05D 7/24* (2013.01); *C04B 28/02* (2013.01); *C04B 41/009* (2013.01); *C04B 41/4884* (2013.01); *C04B 41/63* (2013.01); *B05D 2203/30* (2013.01); *C04B 2111/0012* (2013.01); *C04B 2111/72* (2013.01); *E04F 13/02* (2013.01)

(58) Field of Classification Search
CPC ... B05D 7/22; B05D 1/36; B05D 1/38; B05D 5/10; B05D 7/24; B05D 2203/30; C09D 175/04; C04B 41/009; C04B 41/4884; C04B 41/63; C04B 28/02; E04F 13/02
USPC .................. 427/230–239, 407.1, 407.2, 412; 524/729, 769, 773, 871
See application file for complete search history.

(56) References Cited

U.S. PATENT DOCUMENTS

| | | | | |
|---|---|---|---|---|
| 4,539,345 A | * | 9/1985 | Hansen ..................... | C08K 5/54 156/329 |
| 5,473,043 A | | 12/1995 | Maki et al. | |
| 6,033,466 A | * | 3/2000 | Ito ............................. | C09C 1/42 106/31.6 |
| 6,133,398 A | * | 10/2000 | Bhat et al. ....................... | 528/60 |
| 6,255,433 B1 | * | 7/2001 | Kuroda .................. | C08G 18/12 524/267 |

(Continued)

FOREIGN PATENT DOCUMENTS

| | | | |
|---|---|---|---|
| JP | 52-44174 A | | 4/1977 |
| JP | 8-199061 A | * | 8/1996 |
| JP | 9-31152 A | * | 2/1997 |

(Continued)

OTHER PUBLICATIONS

International Search Report (PCT/ISA/210) dated Aug. 16, 2011, by the Japanese Patent Office as the International Searching Authority for International Application No. PCT/JP2011/062590.

(Continued)

*Primary Examiner* — William Phillip Fletcher, III
(74) *Attorney, Agent, or Firm* — Buchanan Ingersoll & Rooney

(57) ABSTRACT

A one-component type polyurethane resin composition for preventing detachment of concrete pieces and tiles containing an isocyanate group-containing urethane prepolymer (A) and a thixotropy-imparting agent (B), and a method for forming a reinforcing layer on a surface of a concrete structure or tiled wall containing a resin coated film composed thereof, in order to provide a one-component type polyurethane resin composition for preventing detachment of concrete pieces and tiles, which has improved workability by being able to be applied with a trowel or brush, forms a transparent resin coated film after reactive curing that has improved weather resistance without applying a top coat, facilitates diagnosis of deterioration of concrete by being carried out visually during maintenance of concrete structures, is able to maintain the existing appearance of the tiled exteriors of buildings and other structures and eliminates dispersion to surrounding areas during application.

17 Claims, No Drawings

(56) References Cited

U.S. PATENT DOCUMENTS

| | | | |
|---|---|---|---|
| 7,186,763 B2* | 3/2007 | Kayano et al. ............... | 523/205 |
| 2006/0167206 A1* | 7/2006 | Maier ................ | C08G 18/2885 |
| | | | 528/44 |

FOREIGN PATENT DOCUMENTS

| | | | |
|---|---|---|---|
| JP | A-2001-294750 | | 10/2001 |
| JP | 2004-107370 A | * | 4/2004 |
| JP | 2005213844 A | | 8/2005 |
| JP | 2006001812 A | | 1/2006 |
| JP | 2006-274145 A | * | 10/2006 |
| JP | 2007-247290 A | * | 9/2007 |
| KR | 1011241490000 | * | 3/2012 |

OTHER PUBLICATIONS

Notification of Transmittal of Translation of the International Preliminary Report on Patentability (PCT/IB/338), the International Preliminary Report on Patentability (PCT/IB/373), and the Written Opinion of the International Searching Authority (Translation) (PCT/IB/237), issued on Jan. 17, 2013, by the International Bureau of WIPO for International Application No. PCT/JP2011/062590.

Jun. 17, 2015 European Search Report issued in European Application No. 11789852.8.

Jan. 2, 2017 European Office Action issued in European Application No. 11789852.8.

* cited by examiner

ONE-COMPONENT TYPE POLYURETHANE RESIN COMPOSITION FOR PREVENTING DETACHMENT OF CONCRETE PIECES AND TILES AND METHOD FOR PREVENTING DETACHMENT OF CONCRETE PIECES AND TILES USING SAME

RELATED APPLICATIONS

This application claims priority as a continuation application under 35 U.S.C. §120 to PCT/JP2011/062590, which was filed as an International Application on Jun. 1, 2011 designating the U.S., and which claims priority to Japanese Application No. 2010-125657 filed in Japan on Jun. 1, 2010. The entire contents of these applications are hereby incorporated by reference in their entireties.

FIELD

Disclosed is a one-component type polyurethane resin composition used to prevent detachment of concrete pieces and tiles by forming a reinforcing layer on a concrete structure and a wall to which tiles are attached, and to a method for preventing detachment of concrete pieces and tiles that use the one-component type polyurethane resin composition.

BACKGROUND INFORMATION

Pieces of concrete falling from concrete structures have become a problem in recent years. This includes, for example, concrete falling from tunnels, expressway overpasses, railroad piers and bridges. The falling of concrete pieces refers to partial separation of the surface of concrete from the main structure due to some cause of deterioration, or detachment of the concrete in the form of a concrete piece as a result of the separation progressing. Various factors have been indicated as the cause of falling concrete, examples of which include those thought to be based on initial defects such as cracks formed at the time of construction or cold joints, those thought to be caused by damage such as cracking and separation caused by a shock such as an earthquake, and those thought to be attributable to deterioration caused by neutralization, salt damage or reaction with alkaline aggregate following construction of a concrete structure. In addition, there is also the problem of falling tiles caused by such factors as deterioration over time in structures such as building in which tiles are attached to an exterior wall.

In order to prevent concrete pieces falling from these concrete structures, in many cases a reinforcing layer is formed that is obtained by affixing a cloth containing fibers such as glass fibers or carbon fibers to the surface of a concrete structure with an adhesive, and applying an epoxy resin and so forth thereon to embed the fiber sheet in the resin. However, these methods have a large number of processes and make it difficult to shorten construction time and reduce costs. In addition, since considerable time can be required to acclimate and affix the sheet to the surface of the concrete structure, work efficiency is poor and can require considerable skill and expertise. Moreover, since a long period of time can be required for the adhesive to harden, it is difficult to shorten construction time, thereby having a considerable effect on construction. This method has these problems (see Japanese Unexamined Patent Application, First Publication No. H9-59937).

In addition, a method has been developed in recent years that prevents concrete pieces from falling without using a reinforcing agent. This is a spray method in which a protective material containing a rapid-curing urethane resin or urea resin is sprayed using a special apparatus, and forms an extremely hard resin film on the surface of a concrete structure in a short period of time. However, this method has problems such as requiring the use of a special spraying apparatus and the dispersal of the protective material into surrounding areas at the time of spraying.

Moreover, since the various reinforcing materials and protective materials used to prevent accidents caused by detachment of concrete pieces are opaque, there are problems such as difficulty in visually examining deterioration and cracking of concrete during post-construction maintenance, additional requirements in terms of time and labor, and the lack of an aesthetically pleasing appearance (see Japanese Unexamined Patent Application, First Publication No. 2005-213844 and Japanese Unexamined Patent Application, First Publication No. 2006-1812).

In addition, when preventing tiles from falling from structures such as buildings in which tiles are affixed to an exterior wall, the use of the method for preventing accidents caused by detachment of concrete pieces as previously described results in the problem of the appearance of the resulting tiled wall being different from the existing tiled wall.

SUMMARY

For example, there is a need for a one-component type polyurethane resin composition for preventing detachment of concrete pieces and tiles, and a method for preventing detachment of concrete pieces and tiles that uses this composition, that reduces or eliminates drawbacks associated with mixing components and therefore has one-component type of reactive curability that reduces or eliminates the risk of improper mixing, has superior coating workability by being able to be applied with a trowel or brush without requiring a special coating apparatus, and is able to form a high-strength resin coated film having superior weather resistance without the need for a top coat.

According to an exemplary aspect, disclosed is a one-component polyurethane resin composition for reducing or preventing detachment of concrete pieces and tiles, comprising: an isocyanate group-containing urethane prepolymer (A) and a thixotropy-imparting agent (B).

According to an exemplary aspect, disclosed is a method for reducing or preventing detachment of concrete pieces and tiles by forming a reinforcing layer on a surface of a concrete structure or tiled wall, the method comprising: forming a resin coated film by coating an exemplary one-component polyurethane resin composition for reducing or preventing detachment of concrete pieces and tiles.

DETAILED DESCRIPTION

According to an exemplary aspect, disclosed is a one-component type polyurethane resin composition for reducing or preventing detachment of concrete pieces and tiles that have improved coating applicability by being able to be applied with a trowel or brush, are able to form a transparent resin coated film after reactive curing, are able to form a high-strength resin coated film having improved weather resistance without a top coat, facilitate visual diagnoses of deterioration of concrete during concrete structure maintenance, and reduce or eliminate dispersion to surrounding areas during application while maintaining the appearance of tiled exterior walls of buildings and other structures, and a method for reducing or preventing detachment of concrete pieces and tiles using that composition.

For example, the aforementioned problems can be addressed by using a one-component type polyurethane resin composition for reducing or preventing detachment of concrete pieces and tiles containing an isocyanate group-containing urethane prepolymer (A) and a thixotropy-imparting agent (B), and forming a reinforcing layer containing a resin coated film composed thereof on a surface of a concrete structure or tiled wall.

For example, disclosed is:

(1) a one-component type polyurethane resin composition for preventing detachment of concrete pieces and tiles that contains an isocyanate group-containing urethane prepolymer (A) and a thixotropy-imparting agent (B).

An Exemplary Resin Composition:

(2) can further contain a compound (C) that contains a group that regenerates an active hydrogen group by being hydrolyzed by moisture, and
(3) the compound (C) that contains a group that regenerates an active hydrogen group by being hydrolyzed by moisture can be a compound that has an oxazolidine ring.

For example, the resin composition:

(4) can further contain a solvent (D) and a weather resistance stabilizer (E),
(5) the isocyanate group-containing urethane prepolymer (A) can be derived from at least one type of polyisocyanate selected from the group consisting of aliphatic polyisocyanates, alicyclic polyisocyanates and aromatic-aliphatic polyisocyanates, and
(6) the isocyanate group-containing urethane prepolymer (A) can be obtained by reacting polyisocyanate with at least one active hydrogen group-containing compound selected from the group consisting of high molecular weight polyols, low molecular weight polyols, and compounds having at least one each of an active hydrogen group and a photocurable ethylenic unsaturated group, under conditions such that isocyanate groups are in excess with respect to the total active hydrogen groups in hydroxyl groups and active hydrogen groups.

For example, the method for reducing or preventing detachment of concrete pieces and tiles of the present disclosure can be:

(7) a method for reducing or preventing detachment of concrete pieces and tiles by forming a reinforcing layer on a surface of a concrete structure or tiled wall, and includes a step of forming a resin coated film by coating the one-component type polyurethane resin composition for preventing detachment of concrete pieces and tiles described in (1) to (6) above.

An exemplary one-component type polyurethane resin composition for reducing or preventing detachment of concrete pieces and tiles can be applied easily with a trowel or brush, can be applied to vertical surfaces without running, has improved coating workability, is not dispersed to surrounding areas during application, cures rapidly, is able to form a transparent, high-strength resin coated film or high-strength resin coated film after reactive curing, and is able to reduce or prevent detachment of concrete pieces and tiles due to this high-strength resin coated film.

In addition, since a high-strength resin coated film can be formed that has improved weather resistance without a top coat, diagnosis of deterioration of concrete can be facilitated by being carried out visually during maintenance of concrete structures in the case of a transparent, high-strength resin coated film, the existing appearance of the tiled exteriors of buildings and other structures can be maintained, and in comparison with comparative methods using a synthetic resin coated film or continuous fiber sheet composed of glass fibers and the like, work efficiency can be improved and construction time can be shortened, a high level of expertise and skill is not required, and cost reductions can be achieved.

An exemplary isocyanate group-containing urethane prepolymer (A) is crosslinked and cured as a result of isocyanate groups reacting with moisture (humidity) in the atmosphere and forming urea bonds, and is contained as a reactive curing component in the one-component type polyurethane resin composition. This isocyanate group-containing urethane prepolymer (A) can be obtained by reacting an organic isocyanate and an active hydrogen group-containing compound under conditions such that isocyanate groups are in excess with respect to active hydrogen (groups).

Specific examples of the organic isocyanate include organic polyisocyanates and mixtures of organic polyisocyanates and organic monoisocyanates.

Examples of organic polyisocyanates include toluene diisocyanates such as 2,4-toluene diisocyanate or 2,6-toluene diisocyanate, diphenylmethane diisocyanates such as 4,4'-diphenylmethane diisocyanate, 2,4'-diphenylmethane diisocyanate or 2,2'-diphenylmethane diisocyanate, phenylene diisocyanates such as 1,2-phenylene diisocyanate, 1,3-phenylene diisocyanate or 1,4-phenylene diisocyanate, naphthalene diisocyanates such as 2,4,6-trimethylphenyl-1,3-diisocyanate, 2,4,6,-triisopropylphenyl-1,3-diisocyanate, 1,4-naphthalene diisocyanate or 1,5-naphthalene diisocyanate, aromatic polyisocyanates such as chlorophenylene-2,4-diisocyanate, 4,4'-diphenylether diisocyanate, 3,3'-dimethyldiphenylmethane-4,4'-diisocyanate or 3,3'-dimethoxyphenyl-4,4'-diisocyanate, aliphatic polyisocyanates such as 1,6-hexamethylene diisocyanate, 1,4-tetramethylene diisocyanate, 2,2,4-trimethyl-1,6-hexamethylene diisocyanate, 2,4,4-trimethyl-1,6-hexamethylene diisocyanate, decamethylene diisocyanate or lysine diisocyanate, aromatic-aliphatic polyisocyanates including xylylene diisocyanates such as o-xylylene diisocyanate, m-xylylene diisocyanate or p-xylylene diisocyanate, and alicyclic polyisocyanates such as 1,4-cyclohexyl diisocyanate, isophorone diisocyanate, hydrogenated toluene diisocyanate, hydrogenated xylylene diisocyanate or hydrogenated diphenylmethane diisocyanate.

Moreover, organic polyisocyanates such as polymethylene polyphenyl polyisocyanates or crude toluene diisocyanates can be used. In addition, modified isocyanates containing one or more uretidione bonds, isocyanurate bonds, allophanate bonds, burette bonds, uretonimine bonds, carbodiimide bonds, urethane bonds or urea bonds and the like, which are obtained by modifying these organic polyisocyanates, can also be used.

Specific examples of organic monoisocyanates include n-butyl monoisocyanate, n-hexyl monoisocyanate, n-hexadecyl monoisocyanate, n-octadecyl monoisocyanate, p-isopropylphenyl monoisocyanate and p-benzyloxyphenyl monoisocyanate.

Although organic monoisocyanates can be used to modify the isocyanate group-containing prepolymer (A) within a range that does not have a detrimental effect on the cured coated film strength of the one-component type polyurethane resin composition for reducing or preventing detachment of concrete pieces and tiles of the present disclosure, in an exemplary embodiment, it is not used.

Each of these can be used alone or as a combination of two or more types thereof.

Among these, in terms of allowing the obtaining of a low viscosity, transparent liquid and improved weather resistance and durability, organic polyisocyanates are exemplary, while aliphatic polyisocyanates and alicyclic polyisocyanates are exemplary, with isophorone diisocyanate being exemplary.

Examples of active hydrogen group-containing compounds include high molecular weight and low molecular weight polyols, amino alcohols, polyamines and compounds containing at least one each of an active hydrogen group and an ethylenic unsaturated group.

Examples of high molecular weight polyols include polyoxyalkylene-based polyols, polyester polyols, polyester amide polyols, polyether-ester polyols, polycarbonate polyols, poly(meth)acrylic polyols and hydrocarbon-based polyols, and these high molecular weight polyols can have a number average molecular weight of 500 or more.

Examples of polyoxyalkylene-based polyols include those obtained by ring-opening addition polymerization of an alkylene oxide, and those obtained by ring-opening addition polymerization of an alkylene oxide with an initiator such as a compound containing two or more active hydrogens (groups).

Examples of the initiators include low molecular weight polyvalent alcohols such as ethylene glycol, diethylene glycol, propylene glycol, dipropylene glycol, neopentyl glycol, 1,4-butanediol, 1,6-hexanediol, glycerin, trimethylolpropane, pentaerythritol or diglycerin, sugar-based low molecular weight polyvalent alcohols such as sorbitol, sucrose, glucose, lactose or sorbitan, low molecular weight polyvalent phenols such as bisphenol A or bisphenol F, low molecular weight polyamines such as ethylenediamine or butylenediamine, low molecular weight amino alcohols such as monoethanolamine or diethanolamine, low molecular weight polycarboxylic acids such as adipic acid or terephthalic acid, and low molecular weight polyoxyalkylene polyols obtained by reacting at least one type of these compounds with an alkylene oxide.

Examples of alkylene oxides include ethylene oxide, propylene oxide, butylene oxide and tetrahydrofuran. These can be used alone or they can be used by ring-opening addition polymerization of a combination of two or more types thereof.

For example, specific examples of the polyoxyalkylene-based polyols include polyoxyethylene polyol, polyoxypropylene polyol, polytetramethylene ether polyol, poly-(oxyethylene)-(oxypropylene)-random or block copolymer polyol, poly-(oxypropylene)-(oxybutylene)-random or block copolymer polyol, and those in which the molecular terminals thereof have been converted to hydroxyl groups by reacting these various types of polyols with an organic polyisocyanate such as toluene diisocyanate, diphenylmethane diisocyanate, hexamethylene diisocyanate or isophorone diisocyanate under conditions such that hydroxyl groups are in excess with respect to isocyanate group.

The polyoxyalkylene-based polyol can have a number average molecular weight of 500 to 50,000, for example, 1,000 to 20,000, for example, 1,000 to 10,000. In addition, the average number of alcoholic hydroxyl groups per molecule can be 2 or more, for example, 2 to 4, for example, 2. If the number average molecular weight is less than 500, for example, there is the risk of the modulus (tensile stress during low level stretching) and elongation of the resulting cured product becoming poor, resulting in a decrease in dynamic durability. In addition, if the number average molecular weight exceeds 50,000, for example, viscosity increases and the workability of the resulting one-component type polyurethane resin composition decreases, thereby making this undesirable.

The polyoxyalkylene-based polyol can be obtained by using a catalyst such as a composite metal cyanide complex. The total degree of unsaturation can be 0.1 meq/g or less, for example, 0.07 meq/g or less, for example, 0.04 meq/g or less. Molecular weight distribution (ratio Mw/Mn of weight average molecular weight (Mw) to number average molecular weight (Mn) as polystyrene-determined by gel permeation chromatography (GPC)) can be 1.6 or less, for example, 1.0 to 1.3.

For example, a polyoxyalkylene-based polyol can means that, for example, 50% by weight or more, for example, 80% by weight or more, for example, 90% by weight or more of the portion of 1 mole of molecules excluding hydroxyl groups is composed of a polyoxyalkylene. The remainder may be modified with ether, urethane, ester, polycarbonate, polyamide, polyacrylate, polyolefin or the like. For example, 95% by weight or more of the molecule excluding hydroxyl groups can be composed of polyoxyalkylene.

Examples of the aforementioned polyester polyols and polyester amide polyols include compounds obtained by a dehydration-condensation reaction between, for example, a dicarboxylic acid such as succinic acid, adipic acid or terephthalic acid, acid esters thereof or acid anhydrides thereof and a compound containing two or more active hydrogen (groups) used as an initiator when synthesizing the aforementioned polyoxyalkylene-based polyol. Moreover, additional examples include lactone-based polyester polyols obtained by ring-opening polymerization of a cyclic ester (namely, lactone) monomer such as ε-caprolactone.

Examples of the aforementioned polyether-ester polyols include compounds produced from the aforementioned polyoxyalkylene-based polyols and the aforementioned dicarboxylic acids or acid anhydrides and the like.

Examples of the aforementioned polycarbonate polyols include compounds obtained by a dehydrochlorination reaction between the low molecular weight polyvalent alcohol used to produce the polyoxyalkylene-based polyol and phosgene, or compounds obtained by a transesterification reaction between the low molecular weight polyvalent alcohol used to produce the polyoxyalkylene-based polyol and, for example, diethylene carbonate, dimethylcarbonate, diethylcarbonate or diphenyl carbonate.

As poly(meth)acrylic polyol, a poly(meth)acrylic polyol can be used which is obtained from a radical polymerization, such as batch or continuous polymerization in the presence or absence of polymerization initiator and a solvent, and, for example, by a high-temperature continuous polymerization reaction at, for example, 150° C. to 350° C., and for example, 210° C. to 250° C., of an ethylenic unsaturated compound at least containing a hydroxyl group-containing (meth)acrylic monomer. The reaction product can have a narrow molecular weight distribution and low viscosity.

The poly(meth)acrylic polyol may be that obtained by polymerizing a hydroxyl group-containing (meth)acrylic monomer alone or by copolymerizing two or more types thereof, and may also be obtained by copolymerizing one type or two or more types of each with another ethylenic unsaturated compound.

Among these, poly(meth)acryl-based polyol, which is obtained by copolymerizing one type or two or more types of a hydroxyl group-containing (meth)acrylic monomer with one type or two more types of another ethylenic unsaturated compound, is exemplary from the viewpoint of ease of controlling the content of hydroxyl group in the poly(meth) acryl-based polyol, and facilitating selection of physical properties of the cured resin. For example, poly(meth)acryl-based polyol, which is obtained by copolymerizing one type or two or more types of hydroxyl group-containing (meth) acrylic monomer having 9 carbon atoms or less, one type or two more types of hydroxyl group-containing monomer having 10 carbon atoms or more, at a total weight thereof of, for example, 50% by weight or more, for example, 70% by weight or more, and one type or two or more types of an ethylenic unsaturated compound other than that thereof, is exemplary.

During this copolymerization, one type or two or more types of hydroxyl group-containing (meth)acrylic monomers can be respectively used so that the average number of hydroxyl groups per molecule of poly(meth)acrylic polyol can be 1.0 to 10, for example, 1.2 to 3. If the average number of hydroxyl group functional groups exceeds 10, for example, the hardness after curing becomes excessively high, thereby preventing the obtaining of rubber-like elasticity.

Moreover, among these, poly(meth)acrylic polyol in which the number average molecular weight as polystyrene-determined by gel permeation chromatography (GPC) can be 500 to 30,000, for example, 1,000 to 15,000, Tg can be 0° C. or less, for example, −70° C. to −20° C., for example, −70° C. to −30° C., and the viscosity at 25° C. can be 100,000 mPa·s or less, for example, 50,000 mPa·s or less is exemplary. Workability during application can become poor if the number average molecular weight exceeds 30,000, Tg exceeds 0° C., or viscosity at 25° C. exceeds 100,000 mPa·s.

Examples of hydrocarbon-based polyols include polybutadiene polyols or hydrogenated polybutadiene polyols, polyisoprene polyols or hydrogenated polyisoprene polyols, chlorinated polyethylene polyols and chlorinated polypropylene polyols.

In addition, other examples include polyamide resins and polyester resins having a number average molecular weight of 500 or more and containing active hydrogen that are suitable for use in the polyurethane industry.

For example, since the viscosity of the resulting isocyanate group-containing urethane prepolymer (A) is low, the coated film properties after curing can be favorable, and thereby resulting in low viscosity and favorable workability of the obtained one-component type polyurethane resin composition, rubber elastic properties of the cured coated film, high adhesiveness and weather resistance, polyoxyalkylene-based polyols and poly(meth)acrylic polyols are exemplary. In addition, polyoxypropylene polyol and polytetramethylene polyol are exemplary for the polyoxyalkylene-based polyol.

Examples of low molecular weight polyols include low molecular weight polyvalent alcohols having a number average molecular weight of less than 500 previously listed as examples of production raw materials of the polyoxyalkylene-based polyols.

Examples of amino alcohols include monoethanolamine, diethanolamine, N-methyldiethanolamine, N-methyldipropanolamine and N-phenyldiethanolamine.

Examples of polyamines include high molecular weight polyamines such as polyoxyalkylene polyamines having a number average molecular weight of 500 or more in which the terminal of a polyoxyalkylene-based polyol has been converted to an amino group, such as terminally diaminated polypropylene glycol.

Additional examples of polyamines include low molecular weight polyamines having a number average molecular weight of less than 500, such as ethylenediamine, hexamethylenediamine, isophoronediamine, diaminophenylmethane and diethylenetriamine.

The aforementioned compound having at least one or more active hydrogen groups and ethylenic unsaturated groups can be a compound that contains at least one active hydrogen group that reacts with an isocyanate group of the isocyanate group-containing urethane prepolymer (A) and at least one photocurable ethylenic unsaturated group.

Specific examples of these active hydrogen groups include a hydroxyl group, primary amino group, secondary amino group, carboxyl group and mercapto group.

Specific examples of ethylenic unsaturated groups include a vinyl group, vinylene group, cinnamoyl group and acrylonitrile and/or methacryloyl group. Among these, the active hydrogen group can be a hydroxyl group in terms of ease of reaction with an isocyanate group of the isocyanate group-containing urethane prepolymer and a relatively small increase in viscosity. In addition, an acryloyl group and/or methacryloyl group is exemplary as the photocurable ethylenic unsaturated group in terms of forming a coating having improved weather resistance by undergoing a polymerization reaction in a comparatively short period of time as a result of being exposed to light. Examples of compounds containing at least one hydroxyl group for the active hydrogen group and containing at least one acryloyl group and/or methacryloyl group for the photocurable ethylenic unsaturated group include members of the "Aronix" series manufactured by Toagosei Co., Ltd. and members of the "Kayarad" series manufactured by Nippon Kayaku Co., Ltd.

By using a compound respectively containing at least one active hydrogen group and photocurable ethylenic unsaturated group as a portion of a polyol component composing the isocyanate group-containing urethane prepolymer (A), and combining with a high molecular weight polyol, the weather resistance of the isocyanate group-containing urethane prepolymer can be improved. In addition, when a one-component type polyurethane resin composition is further obtained by incorporating the compound (C) containing a group that regenerates the active hydrogen group by hydrolyzing to the isocyanate group-containing urethane prepolymer with moisture to be subsequently described, a coated film can be formed by rapidly curing without impairing workability or causing foaming, and that coated film is able to demonstrate improved rubber properties.

In order for the one-component type polyurethane resin composition containing the isocyanate group-containing urethane prepolymer (A) to have improved weather resistance and superior rubber properties, the compound that respectively contains at least one active hydrogen group and ethylenic unsaturated group can be contained at 1.0% by weight to 7.0% by weight in the active hydrogen group-containing compound that composes the isocyanate group-containing urethane prepolymer (A).

This active hydrogen-containing compound can be used alone or two or more types can be used in combination.

Any suitable urethanation catalyst can be used for the isocyanate group-containing urethane prepolymer (A), examples of which include a metal salt of a metal such as zinc, tin, lead, zirconium, bismuth, cobalt, manganese or iron and an organic acid such as octylic acid, octenic acid or naphthenic acid, such as tin (II) octylate or tin octylate, a metal chelate compound such as dibutyltin diacetylacetonate, zirconium tetraacetylacetonate or a tin-based chelate compound in the form of Excestar C-501 (Asahi Glass Co., Ltd.), an organometallic compound such as dibutyltin dilaurate or dioctyltin dilaurate, or an organic amine such as triethylenediamine, triethylamine or tri-n-butylamine, or salts thereof. Among these, a metal organic acid salt or organometallic compound is exemplary. In addition, an organic catalyst can also be used.

Although the isocyanate group-containing urethane prepolymer (A) can be synthesized by either a batch reaction or multi-stage reaction, it is desirable for the isocyanate groups to remain in molecules of the prepolymer. The equivalent ratio of isocyanate groups/active hydrogen (groups) between isocyanate groups of the organic polyisocyanate and active hydrogen (groups) of the active hydrogen group-containing compound can be (1.1 to 5.0)/1.0, for example, (1.3 to 2.0)/1.0. The isocyanate group content of an isocyanate group-containing urethane prepolymer obtained in this manner can be 0.1% by weight to 15.0% by weight, for example, 0.3% by weight to 10.0% by weight, for example, 0.4% by weight to 8.0% by weight. If the isocyanate group content is less than 0.1% by weight, for example, molecular weight becomes excessively large and viscosity increases resulting in decreased workability. In addition, for example, adequate adhesion cannot be obtained due to the small number of crosslinking sites in the prepolymer. If the isocyanate group content exceeds 15.0% by weight, for example, the number of crosslinking sites in the prepolymer becomes excessively large, resulting in exacerbation of rubber properties, causing foaming of the cured product due to a large amount of carbon dioxide gas generated as a result of reacting with humidity in the air, and resulting in an uneconomical increase in the incorporated amount of the compound (C) containing groups that regenerate the active hydrogen groups as a result of being hydrolyzed by moisture, thereby making this undesirable.

The thixotropy-imparting agent (B) can be used to reduce or prevent the occurrence of running when the one-component type polyurethane resin composition for reducing or preventing detachment of concrete pieces and tiles is applied to a vertical surface of a concrete structure or tiled wall by imparting thixotropy to the one-component type polyurethane resin composition.

Reducing or preventing of the occurrence of running can be an extremely important requirement when using as a one-component type polyurethane resin composition for reducing of preventing detachment of concrete pieces and tiles. For example, reducing or preventing of running improves coating workability when coating with a trowel or brush, enables a sufficient coated film thickness to be secured with fewer applications, and reduces or prevents environmental exacerbation of work sites caused by running of liquid resins following coating. Specific examples of thixotropy-imparting agents include inorganic thixotropy-imparting agents such as fine powdered silica or surface-treated calcium carbonate, and organic thixotropy-imparting agents such as organic bentonite, modified polyester polyols or fatty acid amides, and one type of two or more types thereof can be suitably selected and used. Among these, fine powdered silica is exemplary since it is able to impart thixotropy while incorporated in small amounts. However, the use of a curing accelerating catalyst to be subsequently described in order to accelerate the curing speed of the one-component type polyurethane resin composition can break down the thixotropy-imparting structure of the silica, and it can be desirable to exercise caution at the time of use since it can cause running when applied to a vertical surface. In contrast, surface-treated calcium carbonate can be free of such shortcomings, and is able to impart stable thixotropy.

If the one-component type polyurethane resin composition is that which forms a transparent (clear) cured product, time-based changes in the underlying concrete to which the one-component type polyurethane resin composition is applied can be observed visually, enabling determination of the deterioration status of the underlying concrete to be easily determined, and thereby making this exemplary. Fine powdered silica is exemplary for the thixotropy-imparting agent at this time since it has reinforcing properties and enables the securing of transparency. In addition, fumed silica and treated silica, which is treated with an organic silane compound as will be subsequently described, is exemplary.

In an exemplary embodiment, the amount of the thixotropy-imparting agent used can be 1 part by weight to 200 parts by weight, for example, 5 parts by weight to 150 parts by weight based on a value of 100 parts by weight (resin component) of the isocyanate group-containing urethane prepolymer. If the amount of the thixotropy-imparting agent used is less than 1 part by weight, for example, the effect of imparting thixotropy is lost, while if the amount exceeds 200 parts by weight, for example, the viscosity of the resulting one-component type polyurethane resin composition for reducing or preventing detachment of concrete pieces and tiles increases resulting in poor workability, thereby making this undesirable.

Examples of the fine powdered silica include naturally-occurring silica obtained by crushing, for example, quartz, quartz sand or diatomaceous earth into fine powders, and synthetic silica including wet silica such as precipitated silica and dry silica such as fumed silica. In addition, examples of the properties of silica particle surfaces thereof include hydrophilicity in the case of not treating with an organic material and hydrophobicity in the case of treating particle surfaces with an organic silane compound such as dimethyldichlorosilane.

Examples of the aforementioned surface-treated calcium carbonate include finely powdered synthetic calcium carbonate referred to as precipitated calcium carbonate or light calcium carbonate. In addition, calcium carbonate in which the surface of heavy calcium carbonate obtained by crushing naturally-occurring calcium carbonate into a fine powder, is treated with an organic compound such as a fatty acid, fatty acid alkyl ester, fatty acid metal salt, metal salt of a fatty acid such as rosin acid, reaction product of organic polyisocyanate and stearyl alcohol or coupling agent similar to a silane coupling agent to be subsequently described, is an example of synthetic calcium carbonate used for the purpose of imparting thixotropy-imparting ability and preventing secondary aggregation. Here, a fatty acid metal salt can be a sodium, potassium, calcium or aluminum salt of a fatty acid having 10 to 25 carbon atoms such as stearic acid. Examples of commercial products thereof include Hakuenka CC, Hakuenka CCR, Hakuenka R06, Vigot 10, Vigot 15, Stavigot 15A (all manufactured by Shiraishi Kogyo Co., Ltd.), NCC #3010 and NCC #1010 (manufactured by Nitto Funka Kogyo K.K.).

These can be used alone or two or more types can be used in combination.

The average particle diameter of this surface-treated calcium carbonate can be 0.01 μm to 0.5 μm, for example, 0.03 μm to 0.15 μm. The BET specific surface area can be 5 $m^2/g$ to 200 $m^2/g$, for example, 10 $m^2/g$ to 60 $m^2/g$. If the average particle diameter is less than 0.01 μm or the BET specific surface area exceeds 200 $m^2/g$, for example, viscosity of the resulting curable composition increases resulting in poor workability, thereby making this undesirable. In contrast, if the average particle diameter exceeds 0.5 μm or the BET specific surface area is less than 5 m²/g, for example, the effect of imparting thixotropy is lost, thereby making this undesirable.

Specific examples of the compound (C) containing a group that regenerates active hydrogen groups as a result of being hydrolyzed by moisture include ketimine compounds, enamine compounds and aldimine compounds that form primary and/or secondary amines as a result of being hydrolyzed by moisture, compounds having an oxazolidine ring that form a hydroxyl group and amino group as a result of being hydrolyzed by moisture, and silicic acid ester compounds capable of forming polyols as a result of being hydrolyzed by moisture. Among these, the compounds having an oxazolidine ring are exemplary since the resulting one-component type polyurethane resin composition for preventing detachment of concrete pieces and tiles has improved storage stability, non-foaming properties and curability.

The compounds having an oxazolidine ring can include compounds having in a molecule thereof 1 or more, for example, 2 to 6 oxazolidine rings that are saturated five-member heterocyclic rings containing an oxygen atom and a nitrogen atom, and function as a latent curing agent of the isocyanate group-containing urethane prepolymer (A). When an isocyanate group of the isocyanate group-containing urethane prepolymer (A) reacts with moisture (humidity) in the atmosphere, the prepolymer (A) is cured due to the formation of urea bonds. At the same time, carbon dioxide gas is also generated, resulting in problems such as exacerbation of appearance, rupturing of the cured product and decreased adhesiveness due to the formation of bubbles by the carbon dioxide gas within the cured product. For example, however, when mixing a compound having an oxazolidine ring with the isocyanate group-containing urethane prepolymer (A) and exposing the resulting mixture to humidity, the oxazolidine ring of the compound having an oxazolidine ring is subjected to hydrolysis prior to the isocyanate groups reacting with the humidity. Secondary amino groups and alcoholic hydroxyl groups are generated and these active hydrogens react with the isocyanate groups, and resulting in curing without the generation of carbon dioxide gas. As a result, foaming attributable to carbon dioxide gas can be reduced or prevented in a one-component type polyurethane resin composition for preventing detachment of concrete pieces and tiles in which these are contained.

For example, when an isocyanate group of the isocyanate group-containing urethane prepolymer (A) is derived from an aliphatic organic polyisocyanate, although this isocyanate group reacts slowly with water or alcoholic hydroxyl groups, it reacts rapidly with secondary amino groups regenerated from a compound having an oxazolidine ring resulting in curing. For example, consequently, as will be subsequently described, since an organometallic catalyst is not used at all or if used, the amount used can be held to an extremely small amount. This compound having an oxazolidine ring can act effectively since there is no occurrence of foaming despite the high curing speed.

Specific examples of compounds having an oxazolidine ring include urethane bond-containing oxazolidine compounds and ester bond-containing oxazolidine compounds, which are obtained by reacting a hydroxyl group of a compound having a hydroxyl group and an oxazolidine ring with an isocyanate group of an organic isocyanate compound or carboxyl group of an organic carboxylic acid compound, as well as oxazolidine silyl ethers and carbonate group-containing oxazolidines. Compounds having a urethane group (urethane bond) and an oxazolidine ring are exemplary in terms of production ease and low viscosity.

Specific examples of urethane bond-containing oxazolidine compounds include those obtained by using a hydroxyl group of a compound having a hydroxyl group and oxazolidine ring and an isocyanate group of an organic isocyanate compound so that the molar ratio of isocyanate groups to hydroxyl groups can be within the range of 0.9 to 1.2, for example, 0.95 to 1.05, and reacting in the presence or absence of an organic solvent at a temperature of 50° C. to 100° C.

Examples of organic isocyanate compounds used to synthesize a urethane bond-containing oxazolidine compound include the same organic isocyanate compounds used to synthesize the aforementioned isocyanate group-containing urethane prepolymer (A). In terms of the low crystallinity of the urethane group-containing oxazolidine compound and superior solubility, aliphatic polyisocyanates are exemplary. In addition, at least one type selected from the group consisting of isophorone diisocyanate and hexamethylene diisocyanate is exemplary, and hexamethylene diisocyanate is exemplary.

Specific examples of the compounds having a hydroxyl group and oxazolidine ring as previously described include N-hydroxyalkyl oxazolidines obtained by a dehydration-condensation reaction between a secondary amino group of alkanolamine and a carbonyl group of a ketone compound or aldehyde compound.

An example of a method for synthesizing this compound having a hydroxyl group and an oxazolidine ring includes using 1.0 equivalent or more, for example, 1.0 to 1.5 equivalents or more, for example, 1.0 to 1.2 equivalents or more of a carbonyl group of an aldehyde or ketone to 1.0 moles of a secondary amino group of an alkanolamine, and carrying out a dehydration-condensation reaction while removing the by-product water by heating and refluxing in a solvent such as toluene or xylene.

Examples of alkanolamines include diethanolamine, dipropanolamine and N-(2-hydroxyethyl)-N-(2-hydroxypropyl)amine. Examples of ketone include acetone, diethyl ketone, isopropyl ketone, methyl ethyl ketone, methyl propyl ketone, methyl isopropyl ketone, methyl butyl ketone, methyl isobutyl ketone, methyl t-butyl ketone, diisobutyl ketone, cyclopentanone and cyclohexanone. Examples of aldehyde include aliphatic aldehyde compounds such a acetoaldehyde, propionaldehyde, n-butylaldehyde, isobutylaldehyde, valeraldehyde, isovaleraldehyde, 2-methylbutylaldehyde, n-hexylaldehyde, 2-methylpentylaldehyde, n-octylaldehyde or 3,5,5-trimethylhexylaldehyde, and aromatic aldehyde compounds such as benzaldehyde, methylbenzaldehyde, trimethylbenzaldehyde, ethylbenzaldehyde, isopropylbenzaldehyde, isobutylbenzaldehyde, methoxybenzaldehyde, dimethoxybenzaldehyde or trimethoxybenzaldehyde.

Among these, in consideration of the ease of producing compounds having a hydroxyl group and oxazolidine ring, and improved anti-foaming properties during curing of the resulting one-component type polyurethane resin composition, diethanolamine is exemplary for the alkanolamine. An aldehyde compound is exemplary among ketone compounds or aldehyde compounds. Isobutylaldehyde, 2-methylpentylaldehyde or benzaldehyde is exemplary for the aldehyde compound. Specific examples thereof include 2-isopropyl-3-(2-hydroxyethyl)oxazolidine, 2-(1-methylbutyl)-3-(2-hydroxyethyl)oxazolidine and 2-phenyl-3-(2-hydroxyethyl) oxazolidine.

Oxazolidine silyl ethers can be obtained, for example, by a dealcoholization reaction between the previously described compound having a hydroxyl group and an oxazolidine ring, and an alkoxysilane such as trimethoxysilane, tetramethoxysilane, triethoxysilane, dimethoxydimethylsilane, vinyltrimethoxysilane, vinyltriethoxysilane, 3-glycidoxypropyltrimethoxysilane or 3-glycidoxypropyltriethoxysilane.

Ester oxazolidines can be obtained by, for example, a transesterification reaction between the previously described compound having a hydroxyl group and an oxazolidine ring, and a lower alkyl ester of a dicarboxylic acid or polycarboxylic acid.

Furthermore, the compound having an oxazolidine ring can be substantially free of functional groups that react with an isocyanate group of the isocyanate group-containing urethane prepolymer (A) at a normal temperature of 5° C. to 35° C. Being substantially free means that, during the synthesis of a compound having a urethane group and an oxazolidine ring as previously described, for example, although there are cases in which a small amount of active hydrogen remains in the molecule depending on selection of the equivalent ratio, not presenting a problem in terms of achieving the exemplary advantages described herein if not present.

The amount used of the compound having an oxazolidine ring can be such that the active hydrogen of secondary amino groups generated by hydrolysis of the compound having an oxazolidine ring is 0.3 equivalents or more, for example, 0.5 equivalents to 1.5 equivalents, based on 1.0 equivalents of the isocyanate group in the isocyanate group-containing urethane prepolymer (A). If amount of active hydrogen is less than 0.3 equivalents, for example, preventing of foaming becomes inadequate, thereby making this undesirable.

Next, an explanation is provided of a hydrolysis catalyst of the compound having an oxazolidine ring.

A hydrolysis catalyst of an oxazolidine ring can be added to improve curing speed of the one-component type polyurethane resin composition for reducing or preventing detachment of concrete pieces and tiles by accelerating regeneration of active hydrogen as a result of the compound having an oxazolidine ring hydrolyzing by reacting with moisture in the air, or accelerating the reaction between regenerated active hydrogen and an isocyanate group of the isocyanate group-containing urethane prepolymer (A). Examples thereof include an organometallic catalyst, organic carboxylic acid catalyst, acid anhydrides thereof, p-toluenesulfonylisocyanate, reaction products of p-toluenesulfonylisocyanate and water, and organic phosphoric acid ester compounds.

These can be used alone or two or more types can be used in combination.

The amount used of the hydrolysis catalyst of an oxazolidine ring can be 0.001 parts by weight to 10 parts by weight, for example, 0.1 parts by weight to 5 parts by weight, to 100 parts by weight (resin component) of the isocyanate group-containing urethane prepolymer (A). If the amount used is less than 0.001 parts by weight, the effect of accelerating hydrolysis of the compound having an oxazolidine ring is lost, while if the amount used exceeds 10 parts by weight, it has a detrimental effect on storage stability of a curable composition.

Examples of the solvent (D) that can be used include aliphatic solvents such as n-hexane, alicyclic solvents such as cyclohexane, aromatic solvents such as toluene or xylene, petroleum-based solvents containing these solvents and other suitable organic solvents, and any of these solvents can be used, for example, provided they do not react with any components of the composition.

The weather resistance stabilizer (E) can be used for the purpose of further improving not only weather resistance, but also heat resistance by reducing or preventing oxidation, photodegradation and thermal degradation of the isocyanate group-containing urethane prepolymer (A) after curing. Specific examples of weather resistance stabilizers include antioxidants, ultraviolet absorbers and photocurable compounds.

Examples of the antioxidants include hindered amine-based and hindered phenol-based antioxidants. Examples of hindered amine-based antioxidants include bis(1,2,2,6,6-pentamethyl-4-piperidyl)[[3,5-bis(1,1-dimethylethyl)-4-hydroxyphenyl]methyl]butylmalonate, bis(1,2,2,6,6-pentamethyl-4-piperidyl)sebacate, methyl 1,2,2,6,6-pentamethyl-4-piperidyl)sebacate, and 4-benzoyloxy-2,2,6,6-tetramethylpiperidine. In addition, other examples include hindered amine-based antioxidants having a molecular weight of less than 1,000, such as Sanol LS-292 (trade name) manufactured by Sankyo Co., Ltd. or LA-52, LA-57, LA-62, LA-67, LA-77, LA-82 or LA-87 (trade names) of the Adeka Stub Series manufactured by Asahi Denka Co., Ltd., and hindered amine-based antioxidants having a molecular weight of 1,000 or more, such as LA-63P and LA-68 (trade names) of the aforementioned Adeka Stub series, or 119FL, 2020FDL, 944FD or 944LD (trade names) of Chimassorb Series manufactured by Ciba Specialty Chemicals K.K.

Examples of hindered phenol-based antioxidants include pentaerythritol-tetrakis[3-(3,5-di-tert-butyl-4-hydroxyphenyl)propionate], octadecyl-3-(3,5-di-tert-butyl-4-hydroxyphenyl)propionate, N,N'-hexane-1,6-diylbis[3(3,5-di-tert-butyl-4-hydroxyphenyl)propioamide, benzene propanoate 3,5-bis(1,1-dimethylethyl)-4-hydroxy C7-C9 side chain alkyl ester and 2,4-dimethyl-6-(1-methylpentadecyl)phenol.

Examples of the ultraviolet absorber include benzotriazole-based ultraviolet absorbers such as 2-(3,5-di-tert-butyl-2-hydroxyphenyl)-5-chlorobenzotriazole, triazine-based ultraviolet absorbers such as 2-(4,6-diphenyl-1,3,5-triazin-2-yl)-5-[(hexyl)oxy]-phenol, benzophenone-based ultraviolet absorbers such as octabenzone, and benzoate-based ultraviolet absorbers such as 2,4-di-tert-butylphenyl-3,5-di-tert-butyl-4-hydroxybenzoate.

Examples of the photocurable compounds include compounds having at least one of the aforementioned active hydrogen groups and ethylenic unsaturated groups as well as one or more groups that undergo a curing reaction by light such as an acryloyl group or methacryloyl group. Specific examples include ester acrylates and ester methacrylates such as urethane acrylate and urethane methacrylate or trimethylolpropane triacrylate and trimethylolpropane methacrylate, polyester acrylates and polyester methacrylates such as acrylates and methacrylates of polyethylene adipate polyols, and polyether acrylates and polyether methacrylates such as acrylates and methacrylates of polyether polyols, which are obtained by reacting a hydroxyl group-containing acrylate compound or hydroxyl group-containing methacrylate compound with an isocyanate group-containing urethane resin, as well as vinyl polycinnamates and azidified resins. Monomers or oligomers having a molecular weight of 10,000 or less are exemplary, those having a molecular weight of 5,000 or less are exemplary. Those containing an average of two or more acryloyl groups and/or methacryloyl groups per molecule are exemplary.

The weather resistance stabilizer (E) can be incorporated at 0.1 parts by weight to 30 parts by weight, for example, 1 part by weight to 20 parts by weight, based on 100 parts by weight (resin component) of the isocyanate group-containing urethane prepolymer (A).

Various types of additives can be used in the one-component type polyurethane resin composition for reducing or preventing detachment of concrete pieces and tiles to a degree that does not impair the performance of the one-component type polyurethane resin composition. Examples of additives include fillers, plasticizers, adhesion-imparting agents, curing accelerating catalysts and storage stability improvers (dehydrating agents). These additives can be used for the purpose of strengthening, extending, adjusting physical properties, improving adhesion or improving storage stability.

Examples of the fillers include silicic anhydride and fine quartz powder. Examples of the plasticizers include low molecular weight plasticizers having a molecular weight of less than 500, including phthalic acid esters such as dibutyl phthalate, diheptyl phthalate, dioctyl phthalate, di(2-ethylhexyl)phthalate, butylbenzyl phthalate or butylphthalylbutyl glycolate, non-aromatic dibasic acid esters such as dioctyl adipate or dioctyl sebapate, phosphoric acid esters such as tricresyl phosphate or tributyl phosphate, and high molecular weight plasticizers having a molecular weight of 500 or more, including polyester plasticizers such as polyesters from liquid polyurethane resins, polyesters obtained by dicarboxylic acid and glycols, etherified or esterified derivatives of polyethylene glycol or polypropylene glycol, polyether plasticizers such as sugar-based polyethers obtained by addition polymerization of sugar polyvalent alcohol such as sucrose with ethylene oxide or propylene oxide and a followed by esterification or etherification, polystyrene-based plasticizers such as poly-α-methylstyrene, and low viscosity (meth)acrylic acid-based plasticizers.

These can be used alone or two or more types can be used in combination.

Among these, a high molecular weight plasticizer having a molecular weight of 500 or more is exemplary for the plasticizer since it is resistant to migration (bleeding) on the surface of cured products, while a liquid polyurethane resin is exemplary.

The plasticizer can be used at 1 part by weight to 500 parts by weight, for example, 10 parts by weight to 100 parts by weight, based on 100 parts by weight (resin component) of the isocyanate group-containing urethane prepolymer (A).

Examples of the adhesion-imparting agents include various types of coupling agents such as silane, titanate, aluminum and zircoaluminate-based coupling agents and/or their partially hydrolyzed condensation products, organic polyisocyanates and epoxy resins.

Specific examples of silane-based coupling agents include low molecular weight compounds having a molecular weight of 500 or less, for example, 400 or less, and/or compounds having a molecular weight of 200 to 3000 that are partially hydrolyzed condensation products of one type or two or more types of silane-based coupling agents. Examples of those include hydrocarbon-bonded alkoxysilanes such as methyltrimethoxysilane, dimethyldimethoxysilane, trimethylmethoxysilane, n-propyltrimethoxysilane, ethyltrimethoxysilane, diethyldiethoxysilane, n-butyltrimethoxysilane, n-hexyltriethoxysilane, n-octyltrimethoxysilane, phenyltrimethoxysilane, diphenyldimethoxysilane or cyclohexyldimethoxysilane, hydrocarbon-bonded isopropenoxysilanes such as dimethyldiisopropenoxysilane or methyltriisopropenoxysilane, alkoxysilanes having a functional group such as 3-glycidoxypropylmethyldiethoxysilane, 3-glycidoxypropyltrimethoxysilane, vinyltrimethoxysilane, vinyldimethylmethoxysilane, 3-aminopropyltrimethoxysilane, N-(2-aminoethyl)-3-aminopropylmethyldimethoxysilane, 3-mercaptopropyltrimethoxysilane, 3-glycidoxypropylmethyldiisopropenoxysilane, 3-glycidoxypropylethoxysilane, N-(2-aminoethyl)-3-aminopropylmethyldimethoxysilane, 3-aryloxypropyltrimethoxysilane or N-phenyl-3-aminopropyltrimethoxysilane.

Examples of the storage stability improvers include low molecular weight crosslinking silyl group-containing compounds such as the aforementioned vinyltrimethoxysilane, and p-toluenesulfonyl isocyanates, which react with moisture present in the composition.

Specific examples of the curing acceleration catalysts include organometallic compounds and amines. Examples of those include divalent organic tin compounds such as tin octylate or tin naphthenate, tetravalent organic tin compounds such as dibutyltin octoate, dibutyltin dilaurate, dibutyltin diacetate, dibutyltin dimaleate, dibutyltin distearate, dioctyltin dilaurate, dioctyltin diversatate, dibutyltin oxide, dibutyltin bis(triethoxysilicate) or reaction products of dibutyltin oxide and phthalic acid esters, various types of metal chelate compounds such as dibutyltin bis(acetylacetonate), the tin-based chelate compound Excestar C-501 manufactured by Asahi Glass Co., Ltd., dizirconium tetrakis(acetylacetonate), titanium tetrakis(acetylacetonate), aluminum tris(acetylacetonate), aluminum tris(ethylacetonate), acetylacetone cobalt, acetylacetone iron, acetylacetone copper, acetylacetone magnesium, acetylacetone bismuth, acetylacetone nickel, acetylacetone zinc or acetylacetone manganese, organic acid lead salts such as lead octylate, titanic acid esters such as tetra-n-butyltitanate or tetrapropyltitanate, organic bismuth compounds such as bismuth octylate or bismuth versatate, primary amines such as butylamine or octylamine, secondary amines such as dibutylamine or dioctylamine, alkanolamines such as monoethanolamine, diethanolamine or triethanolamine, primary and secondary amines such as diethylenetriamine or triethylenetetramine, tertiary amines such as triethylamine, tributylamine, triethylenediamine or N-ethylmorpholine or salts of these amines and carboxylic acids, inorganic acidic compounds such as kaolin clay or hydrochloric acid, and organic phosphate-based acidic compounds such as ethyl acid phosphate or 2-ethylhexylphosphate or salts of these compounds and amines. Among these, organometallic compounds and metal chelate compounds are exemplary in terms of their rapid reaction rate and being liquids having comparatively low toxicity and volatility. Tin-based chelate compounds are exemplary, and dibutyltin (acetylacetonate) is exemplary.

From the viewpoints of curing speed, physical properties of the cured product and the like, the curing acceleration catalyst can be incorporated at 0 parts by weight to 5 parts by weight, for example, 0.01 parts by weight to 2 parts by weight, based on 100 parts by weight (resin component) of the isocyanate group-containing urethane prepolymer (A). The use of more than 2 parts by weight of the curing acceleration catalyst can be undesirable since it causes deterioration of the coated film after curing.

The method for reducing or preventing detachment of concrete pieces and tiles can reduce or prevent concrete pieces from detaching from concrete structures and can reduce or prevent tiles from detaching from tiled walls by forming a reinforcing layer composed of a synthetic resin on the surface of a concrete structure or tiled wall such as a railing or pier of a highway or railroad elevated bridge. Examples of sites where the reinforcing layer can be formed include locations where there is the risk of concrete detachment and tiled wall surfaces such as the exterior wall or lower surface of a concrete structure. For example, in the case of an elevated bridge, applicable locations include an exterior wall of a railing or pier, the lower surface of a floor plate or bridge girder, the lower surface of a pier overhang and a tiled building exterior wall. More specifically, an exemplary method is as described below.

(1) Weakened layers, dust and foreign objects are first removed from the surface of the concrete structure. Moreover, in the case projections or level differences are present on the surface of the concrete structure, the surface is smoothened using a tool. After having smoothened the portion of the surface of the concrete structure where the reinforcing layer is to be formed (formed surface), the formed surface is cleaned with a brush or air blower and the like to remove dust and foreign objects.

(2) Next, a primer layer is formed, depending on the case, by coating a primer onto the cleaned surface of the concrete structure. Various methods can be used to coat the primer onto the surface of the concrete structure, such as spraying with a spray gun or coating with a roller, brush or coating rake.

(3) Next, a resin coated film is formed on the surface of the concrete structure on which a primer layer has been formed depending on the case by coating the one-component type polyurethane resin composition of the present disclosure. Various methods can be used to form the resin coated film on the surface of the concrete structure, such as coating with a roller, trowel or coating rake. In addition, depending on the case, a resin coated film can be formed by embedding a glass cloth and/or woven fiber mesh in a resin coated film in order to secure adequate resin coated film thickness or further reinforce the resin coated film layer.

In addition, a reinforcing layer can be similarly formed for a tiled wall as well.

In an exemplary method for reducing or preventing detachment of concrete pieces and tiles, a reinforcing layer composed of a synthetic resin is formed on a formed surface of the surface of a concrete structure or tiled wall according to the aforementioned (1) to (3). This reinforcing layer is formed from a resin coated film layer containing a primer layer, or depending on the case, a glass cloth and/or woven fiber mesh embedded in the resin coated film in order to secure adequate resin coated film thickness or further reinforce the resin coated film layer. The primer layer in the case of using a primer can have affinity for a concrete structure or tiled wall and the resin coated film. Since there are also cases in the surface of the concrete structure or tiled wall is wet, it can also be adhered to a wet surface. A primer composed of a urethane resin that cures at normal temperatures or an epoxy resin can used for the primer layer, and may be cured by one-component liquid curing or two-component liquid curing.

The thickness of the resin coated film can be about 0.5 mm to 4 mm. A resin coated film formed using the one-component type polyurethane resin composition can have suitable elongation, softness and elasticity, deforms by following deformation of a concrete structure caused by deflection. Due to its resistance to breaking, the resin coated film formed using the one-component type polyurethane resin composition can be able to stably maintain a function that prevents detachment of concrete fragments and chunks from concrete structures and a function that reduces or prevents detachment of tiles from tiled walls over a long period of time.

For example, a reinforcing layer formed on a concrete surface and a reinforcing layer formed on a tiled wall, which are composed of a laminated structure containing a resin coated film layer formed by coating the one component-type polyurethane resin composition and a primer layer formed in the case of using a primer, are able to demonstrate adequate detachment preventive effects without using a glass cloth and/or fiber woven mesh (such as a triaxial Vinylon mesh). In addition, adequate detachment preventive effects can be demonstrated by the method of preventing detachment of concrete pieces and detachment of tiles from tiled walls using the one-component type polyurethane resin composition of the present disclosure. More specifically, in a push-out test employed as a testing method by the Japan Highway Public Corporation in the examples to be subsequently described, a reinforcing layer can be obtained that demonstrates displacement of 10 mm or more and maximum stress of 1.5 kN or more. In addition, in the case of mainly using the isocyanate group-containing urethane prepolymer (A) and a primer, transparency of the reinforcing layer can be adjusted according to the type of primer selected. Furthermore, a reinforcing layer can be formed that does not demonstrate discoloration or obstruct visual observation of underlying layers immediately after being formed or even after being exposed outdoors for a long period of time. For example, a reinforcing layer can be formed that demonstrates a test piece color difference ($\Delta E$) value of ≤3 and a gloss retention ratio of 80% or more as determined with a sunshine weather meter following exposure for 1000 hours.

Although a top coat layer is not necessary for the resin coated film, a top coating layer can be used.

EXAMPLES

Synthesis of Isocyanate Group-Containing Urethane Prepolymer P-1

78.1 g of polytetramethylene ether glycol (Hodogaya Chemical Co., Ltd., PTG2000SN, average molecular weight: 2,000) and 2.3 g of pentaerythritol triacrylate (Toagosei Co., Ltd., Aronix M305, molecular weight: 298) as a compound having an active hydrogen group and ethylenic unsaturated group, and 30.0 g of ethyl acetate were charged into a reaction vessel equipped with a stirrer, thermometer, nitrogen sealed tube and heating and cooling device in the presence of flowing nitrogen gas, 19.6 g of isophorone diisocyanate (Degussa Japan Co., Ltd., Vestanat IPDI, molecular weight: 222) were charged while stirring, 0.02 g of dibutyltin dilaurate were further added as reaction catalyst, the reaction was allowed to proceed for 2 hours at 70° C. to 80° C. while stirring, and the reaction was stopped at the point the isocyanate group content became equal to or less than the theoretical value (2.92% by weight) as determined by titration followed by cooling to synthesize isocyanate group-containing urethane prepolymer P-1. The resulting isocyanate group-containing urethane prepolymer P-1 was a clear liquid at normal temperatures having an R value of 2.05, isocyanate group content as determined by titration of 2.81% by weight, and viscosity at 25° C. of 1,200 mPa·s.

(Synthesis of Isocyanate Group-Containing Urethane Prepolymer P-2)

71.6 g of polytetramethylene ether glycol (Hodogaya Chemical Co., Ltd., PTG2000SN, average molecular weight: 2,000), 2.1 g of Aronix M305 and 30.0 g ethyl acetate were charged into a reaction vessel equipped with a stirrer, thermometer, nitrogen sealed tube and heating and cooling device in the presence of flowing nitrogen gas, 26.2 g of isophorone diisocyanate (Degussa Japan Co., Ltd., Vestanat IPDI, molecular weight: 222) were charged while stirring, 0.02 g of dibutyltin dilaurate were further added as reaction catalyst, the reaction was allowed to proceed for 2 hours at 70° C. to 80° C. while stirring, and the reaction was stopped at the point the isocyanate group content became equal to or less than the theoretical value (5.09% by weight) as determined by titration followed by cooling to synthesize isocyanate group-containing urethane prepolymer P-2. The resulting isocyanate group-containing urethane prepolymer P-2 was a clear liquid at normal temperatures having an R value of 3.0, isocyanate group content as determined by titration of 5.00% by weight, and viscosity at 25° C. of 600 mPa·s.

(Synthesis of Isocyanate Group-Containing Urethane Prepolymer P-3)

63.9 g of polytetramethylene ether glycol (Hodogaya Chemical Co., Ltd., PTG2000SN, average molecular weight: 2,000), 1.9 g of Aronix 305, 1.3 g of trimethylolpropane (TMP) and 30.0 g of ethyl acetate were charged into a reaction vessel equipped with a stirrer, thermometer, nitrogen sealed tube and heating and cooling device in the presence of flowing nitrogen gas, 32.9 g of isophorone diisocyanate (Degussa Japan Co., Ltd., Vestanat IPDI, molecular weight: 222) were charged while stirring, 0.02 g of dibutyltin dilaurate were further added as reaction catalyst, the reaction was allowed to proceed for 2 hours at 70° C. to 80° C. while stirring, and the reaction was stopped at the point the isocyanate group content became equal to or less than the theoretical value (6.39% by weight) as determined by titration followed by cooling to synthesize isocyanate group-containing urethane prepolymer P-3. The resulting isocyanate group-containing urethane prepolymer P-3 was a clear liquid at normal temperatures having an R value of 3.0, isocyanate group content as determined by titration of 6.28% by weight, and viscosity at 25° C. of 1,500 mPa·s.

(Synthesis of Isocyanate Group-Containing Urethane Prepolymer P-4)

46.8 g of polytetramethylene ether glycol (Hodogaya Chemical Co., Ltd., PTG2000SN, average molecular weight: 2,000), 2.0 g of Aronix 305, 20.0 g of acrylic polyol (Toagosei Co., Ltd., UH2032, average molecular weight: 2,000) and 30.0 g of ethyl acetate were charged into a reaction vessel equipped with a stirrer, thermometer, nitrogen sealed tube and heating and cooling device in the presence of flowing nitrogen gas, 31.2 g of isophorone diisocyanate (Degussa Japan Co., Ltd., Vestanat IPDI, molecular weight: 222) were charged while stirring, 0.02 g of dibutyltin dilaurate were further added as reaction catalyst, the reaction was allowed to proceed for 2 hours at 70° C. to 80° C. while stirring, and the reaction was stopped at the point the isocyanate group content became equal to or less than the theoretical value (6.05% by weight) as determined by titration followed by cooling to synthesize isocyanate group-containing urethane prepolymer P-4. The resulting isocyanate group-containing urethane prepolymer P-4 was a clear liquid at normal temperatures having an R value of 3.0, isocyanate group content as determined by titration of 5.98% by weight, and viscosity at 25° C. of 500 mPa·s.

(Synthesis of Urethane Bisoxazolidine)

After placing 435.0 g of diethanolamine in a reaction vessel equipped with a stirrer, thermometer, nitrogen sealed tube and heating and cooling device, 183.3 g of toluene were added. After further adding 328.3 g of isobutyl aldehyde thereto while stirring, the mixture was heated and a dehydration reaction was continued for 3 hours at 110° C. to 150° C. to remove 74.5 g of water with an ester tube. Next, the mixture was subjected to reduced pressure to remove excess isobutyl aldehyde and toluene and obtain a hydroxyl group-containing oxazolidine compound. 341.0 g of hexamethylene diisocyanate were added to 658.9 g of this hydroxyl group-containing oxazolidine compound followed by heating for 8 hours at 80° C. and terminating the urethanation reaction at the point the measured isocyanate group content reached 0.0% by weight or less as determined by titration. The resulting reaction product was a semi-clear liquid at normal temperatures.

Example 1

130.0 g of the isocyanate group-containing urethane prepolymer P-1 obtained in Synthesis Example 1, 2.0 g of ethyl acetate, 1.0 g of hindered amine-based antioxidant (Sankyo Co., Ltd. Sanol LS-292 (trade name)), 1.0 g of hindered amine-based antioxidant (Ciba Specialty Chemicals K.K., Irganox 1010), 16.9 g of the synthesized urethane bisoxazolidine and 12.1 g of thixotropy-imparting agent (Nippon Aerosil Co., Ltd., Aerosil 200, foamed silica, specific surface area: 200 m$^2$/g) were sequentially charged into a mixing vessel equipped with a cooling device and a nitrogen sealed tube in the presence of flowing nitrogen gas, and mixed to uniformity. Next, the mixture was defoamed under reduced pressure at 30 hPa to 100 hPa and then filled into and sealed in a container to prepare a transparent, paste-like one component-type polyurethane resin composition for reducing or preventing detachment of concrete pieces and tiles.

Example 2

A transparent, paste-like one component-type polyurethane resin composition for reducing or preventing detachment of concrete pieces and tiles was prepared in the same manner as Example 1 with the exception of using 130.0 g of the isocyanate group-containing urethane prepolymer P2 instead of the isocyanate group-containing urethane prepolymer P1, using 30.1 g of urethane bisoxazolidine, and using 13.1 g of thixotropy-imparting agent.

Example 3

A transparent, paste-like one component-type polyurethane resin composition for reducing or preventing detachment of concrete pieces and tiles was prepared in the same manner as Example 1 with the exception of using 130.0 g of the isocyanate group-containing urethane prepolymer P3 instead of the isocyanate group-containing urethane prepolymer P1, using 37.8 g of urethane bisoxazolidine, and using 13.7 g of thixotropy-imparting agent.

Example 4

A transparent, paste-like one component-type polyurethane resin composition for reducing or preventing detachment of concrete pieces and tiles was prepared in the same manner as Example 1 with the exception of using 130.0 g of the isocyanate group-containing urethane prepolymer P4 instead of the isocyanate group-containing urethane prepolymer P1, using 36.0 g of urethane bisoxazolidine, and using 13.6 g of thixotropy-imparting agent.

Comparative Example 1

A transparent, paste-like one component-type polyurethane resin composition for reducing or preventing detachment of concrete pieces and tiles was prepared in the same manner as Example 1 with the exception of not using a thixotropy-imparting agent.

Comparative Example 2

A two-component liquid curing polyurethane resin (Dyflex Corp., trade name: CV Spray R3, main agent:curing agent=1:1 (volume ratio)) and a top coat (Dyflex Corp., trade name: Resitop, main agent:curing agent=1:3 (weight ratio)) were used.

Comparative Example 3

117 parts by mass of a Component A containing 97 parts by mass of Mitseron B-500 Gray Coating (manufactured by Mitsui Metal Paint Chemical Co., Ltd., coating liquid containing 54 parts by mass of polyol component having a hydroxyl group equivalent of 625 g/eq and an average number of functional groups of 2.7, 40 parts by mass of pigment containing titanium dioxide, silicon dioxide, mica and carbon black, and 3 parts by mass of additive, solid content: 100%) and 20 parts by mass of titanium dioxide, and 33 parts by mass of a Component B containing Mitseron A-5000 Curing Agent (polyisocyanate manufactured by Mitsui Metal Paint Chemical Co., Ltd., isocyanate group equivalent: 135, average number of functional groups: 2.7, solid content: 100%) were mixed and stirred for 1 minute under conditions of 1,500 rpm with a desktop disperser followed by defoaming under reduced pressure of 30 hPa to 100 hPa to obtain a resin composition.

(Performance Tests)

The following performance tests were carried out on the resin compositions of Examples 1 to 4 and Comparative Example 1 to 3. The results are shown in Table 1.

(1) Appearance

The one component-type polyurethane resin compositions for reducing or preventing detachment of concrete pieces and tiles were formed into a sheet having a thickness of about 2 mm and cured for 10 days in a standard state consisting of 23° C. and 50% relative humidity to produce a cured product. The cured products were then evaluated according to visual appearance. The cured products were evaluated as "Excellent" when colorless and clear, as "Good" when slightly colored or slightly turbid, or as "Poor" when colored or turbid.

(2) Tack-Free Time

Tack-free time was measured at 23° C. and 50% relative humidity in compliance with section 4.19 stipulating the tack-free test in JIS A1439 (1997, revised 2002) entitled "Testing methods of sealants for sealing and glazing in buildings".

(3) Runniness

Viscosity at 25° C. was measured at 10 rpm and 100 rpm using Rotor No. 7 of a B8U type rotary viscometer, and TI value (=viscosity value at 10 rpm/viscosity value at 100 rpm) was calculated as an indicator of runniness during application of the one-component type polyurethane resin compositions for preventing detachment of concrete pieces and tiles. The compositions were evaluated as "Excellent" for a TI value of 4.0 or more, or "Poor" for a TI value of less than 4.0.

(4) Rubber Properties

Tensile stress during 100% elongation (M100), tensile strength during breakage (Tb) and elongation during breakage (Eb) were measured in compliance with JIS K6251 (1993) entitled "Rubber, vulcanized or thermoplastic-Determination of tensile stress-strain properties". The one-component type polyurethane resin compositions for reducing or preventing detachment of concrete pieces and tiles were formed into a sheet having a thickness of about 2 mm and cured for 10 days in a standard state containing 23° C. and 50% relative humidity. Next, a test piece was stamped from the sheet using a no. 4 dumbbell shape followed by carrying out the tensile test using that test piece.

Tear strength was measured in compliance with JIS K6252 (2001) entitled "Rubber, vulcanized or thermoplastic—Determination of tear strength". At that time, a test piece was stamped out from the sheet using an angle shape without making a cut into the sheet, and testing was carried out using that test piece.

Hardness was measured in compliance with section 5 stipulating "Durometer Hardness (Type D Durometer)" of JIS K6253 (1997) entitled "Rubber, vulcanized or thermoplastic—Determination of hardness".

(5) Accelerated Exposure Test

Evaluations were carried out using a sunshine weather meter as stipulated in JIS B7753 (black panel temperature: 63° C., shower: 18 min/120 min, Suga Test Instruments Co., Ltd.). The test pieces were obtained by forming the one-component type polyurethane resin compositions for reducing or preventing detachment of concrete pieces and tiles into a sheet having a thickness of about 2 mm followed by curing for 10 days in a standard state containing 23° C. and 50% relative humidity. Next, test pieces in the shape of strips measuring 100 mm long×50 mm wide×2 mm thick were sampled from the sheets and used in an accelerated exposure test. The test pieces were then observed visually and evaluated as "Excellent" when free of cracking and discoloration, as "Good" when only slight cracking or discoloration was observed, and as "Poor" when cracking and discoloration were observed by visual observation.

(6) Gloss Retention Ratio

Specular gloss following the accelerated exposure test was evaluated using as an initial value the specular gloss (micro-TRI-gloss, BYK Gardner Corp.) of the test pieces after curing in the accelerated exposure test in compliance with JIS K5600-4-7 (1999) entitled "Testing methods for paints—Specular gloss (60°)". The test pieces were evaluated as "Excellent" for a retention ratio of 80% or more, "Good" for a retention ratio of 60% or more, and "Poor" for a retention ratio of less than 60%.

(7) Color Difference (ΔE)

The L*a*b values of the test pieces following the accelerated exposure test were evaluated in terms of ΔE using as an initial value the L*a*b values of the test pieces after curing in the accelerated exposure test (spectrophotometer: CM-2500d, Konica Minolta Ltd.) in compliance with JIS K5600-4-6 (1999) entitled "Testing methods for paints—Colorimetry (SCE)". The test pieces were evaluated as "Excellent" for a ΔE value of ΔE≤3, as "Good" for a value of 3<ΔE≤1, or as "Poor" for a value of 15<ΔE.

(8) Push-Out Test

A push-out test was carried out in compliance with JHS-424:2004 entitled "Push-Out Test Method of Prevention of Falling".

A type 1 size 300 (400×600×60 mm) cap-type U-shaped side groove (to be referred to as a U-shaped cap) stipulated in JIS A5372 was used for the substrate. A one-component liquid urethane-based resin solvent-based primer (Auto Chemical Ind. Co., Ltd., trade name: OP-2531) was used as primer and coated with a roller at 0.15 kg/m² followed by curing for 1 hour at 23° C. Next, a backer measuring 2 mm thick×10 mm wide was used to form a frame around the four sides of the primer coated surface of the U-shaped cap to secure the resin coated film thickness. Next, the one-component type polyurethane resin compositions for preventing detachment of concrete pieces and tiles were coated in the frame and cured for 7 days at 23° C. Next, the coated compositions were immersed halfway in water so that the opposite side of the surface where the reinforcing layer was formed was submerged in water followed by curing the reinforcing layer for 1 week. Next, the U-shaped cap on which the reinforcing layer was formed was placed on H-beams at a span of 400 mm with the surface on the side in which perforations were formed facing upward. Next, a load cell was placed on the bottom surface of the perforations so that the load acted vertically and uniformly on the central portion of the bottom surface of the perforations. The maximum push-out load (maximum load carrying capacity) was measured by carrying out a push-out test applying a load at the rate of 5 mm/min. Falling prevention performance was confirmed up to a maximum displacement of about 60 mm. The compositions were evaluated as "Excellent" in the case of satisfying the class A criteria of load cell displacement of 10 mm or more and maximum load carrying capacity of 1.5 kN or more as stipulated in the "Push-Out Test Method of Continuous Fiber Sheet Adhesion" of the Japan Highway Public Corporation Test and Research Standards, while compositions were evaluated as "Poor" in the case of load cell displacement of less than 10 mm and maximum load carrying capacity of less than 1.5 kN.

TABLE 1

|  | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Raw material composition (g) |  |  |  |  |  |  |  |
| Isocyanate group-containing urethane prepolymer P-1 | 130.0 |  |  |  | 130.0 | Dyflex Corp., two-component liquid urethane coating | Mitsui Metal Paint Chemical, two-component liquid urethane coating (gray) |
| Isocyanate group-containing urethane prepolymer P-2 |  | 130.0 |  |  |  |  |  |
| Isocyanate group-containing urethane prepolymer P-3 |  |  | 130.0 |  |  |  |  |
| Isocyanate group-containing urethane prepolymer P-4 (resin ratio of urethane prepolymer: 100%) |  |  |  | 130.0 |  |  |  |
| Solvent | 2.0 | 2.0 | 2.0 | 2.0 | 2.0 |  |  |
| Hindered amine antioxidant | 1.0 | 1.0 | 1.0 | 1.0 | 1.0 |  |  |
| Hindered phenol antioxidant | 1.0 | 1.0 | 1.0 | 1.0 | 1.0 |  |  |
| Urethane bisoxazolidine | 16.9 | 30.1 | 37.8 | 36.0 | 16.9 |  |  |
| Thixotropy-imparting agent | 12.1 | 13.1 | 13.7 | 13.6 | 0.0 |  |  |
| Appearance | Excellent | Excellent | Excellent | Excellent | Excellent | Poor | Poor |
| Runniness | Excellent | Excellent | Excellent | Excellent | Poor |  | Excellent |
| Tack-free time (hr) | 1.0 | 1.5 | 2.0 | 1.0 | 1.0 |  | 2.0 |
| Rubber properties |  |  |  |  |  |  |  |
| M100 (N/mm²) | 3.0 | 9.0 | 14 | 13 | 3.0 | 5.0 | — |
| Tb (N/mm²) | 24 | 35 | 27 | 32 | 25 | 10 | 1.8 |
| Eb (%) | 530 | 360 | 270 | 330 | 400 | 414 | 10 |
| Tear strength (N/mm²) | 45 | 87 | 89 | 102 | 43 | 66 | — |
| Shore D hardness | 25 | 45 | 60 | 50 | 25 | 30 | — |
| Accelerated exposure 500 h | Excellent | Excellent | Excellent | Excellent | Excellent | Excellent | Poor |
| (sunshine weather meter) 1000 h | Excellent | Excellent | Excellent | Excellent | Excellent | Excellent | — |
| Gloss retention ratio 500 h | Excellent | Excellent | Excellent | Excellent | Excellent | Excellent | — |
| (sunshine weather meter) 1000 h | Excellent | Excellent | Excellent | Excellent | Excellent | Excellent | — |
| Color difference (ΔE) 500 h | Excellent | Excellent | Excellent | Excellent | Excellent | Excellent | — |
| 1000 h | Excellent | Excellent | Excellent | Excellent | Excellent | Excellent | — |
| Push-out test | Excellent | Excellent | Excellent | Excellent | Excellent | Excellent | Poor |

Example 5

The following provides a detailed description of the effects of the method for reducing or preventing detachment of concrete pieces and tiles.

The performance of a reinforcing layer formed on the surface of a concrete structure or tiled wall was evaluated in compliance with the "Push-Out Test Method of Continuous Fiber Sheet Adhesion" of the Japan Highway Public Corporation Test and Research Standards. A U-shaped cap (400×600×60 mm) was used for the substrate, and this was immersed in water for 24 hours. Next, the U-shaped cap was removed from the water, and moisture on the surface was wiped off with a rag with the surface on the side on which perforations were formed as the bottom surface and the side opposing the bottom surface as the top surface. Next, primer was coated onto the top surface, and a resin coated film was formed with a single piece of triaxial Vinylon mesh (mesh width: 2 mm) manufactured by Nitto Boseki Co., Ltd. interposed between the primer and the resin coated film to obtain a reinforcing layer. A one-component liquid urethane-based resin solvent-based primer (Auto Chemical Ind. Co., Ltd., trade name: OP-2531) was used for the primer, while the clear, paste-like one-component type polyurethane resin composition for preventing detachment of concrete pieces and tiles of Example 2 was used for the resin composition that forms the resin coated film. The amount of primer used was 0.2 kg/m². The film thickness of the resin coated film of the synthetic resin that forms the resin coated film was an average measured film thickness of the core and the area surrounding the core of 1.95 mm for the first trial, while the average measured film thickness of the core and area surrounding the core was 2.80 mm for the second trial. Next, after forming the reinforcing layer, the test piece was immersed halfway in water so that side on which the reinforcing layer was formed was submerged in water followed by curing the reinforcing layer for 1 week. Next, the U-shaped cap on which the reinforcing layer was formed was placed on H-beams at a span of 400 mm with the surface on the side in which perforations were formed facing upward. Next, a load cell was placed on the bottom surface of the perforations so that the load acted vertically and uniformly on the central portion of the bottom surface of the perforations. A push-out test was then carried out by applying the load at the rate of 5 mm/min to measure the maximum push-out load (maximum load carrying capacity) was measured. Falling prevention performance was confirmed up to a maximum displacement of about 60 mm. As a result, during the first trial, the maximum load was 2.0 kN, displacement during the maximum load was 17 mm and displacement during occurrence of damage was 18 mm, while during the second trial, the maximum load was 2.3 kN, displacement during the maximum load was 16 mm, and displacement during occurrence of damage was 36 mm. These results adequately satisfy the criteria of a load cell displacement of 10 mm or more and maximum load carrying capacity of 1.5 kN or more as stipulated in the "Push-Out Test Method of Continuous Fiber Sheet Adhesion" of the Japan Highway Public Corporation Test and Research Standards.

Example 6

The performance of the reinforcing layer formed on the top surface of a concrete structure or tiled wall was evaluated in the same manner as Example 5 with the exception of not using the triaxial Vinylon mesh manufactured by Nitto Boseki Co., Ltd.

The film thickness of the resin coated film of the synthetic resin that forms the resin coated film was an average measured film thickness of the core and the area surrounding the core of 1.08 mm for the first trial, while the average measured film thickness of the core and area surrounding the core was 1.37 mm for the second trial. As a result of a push-out test, during the first trial, the maximum load was 3.2 kN, displacement during the maximum load was 60 mm and displacement during occurrence of damage was 60 mm, while during the second trial, the maximum load was 4.4 kN, displacement during the maximum load was 60 mm, and displacement during occurrence of damage was 60 mm. These results adequately satisfy the criteria of a load cell displacement of 10 mm or more and maximum load carrying capacity of 1.5 kN or more as stipulated in the "Push-Out Test Method of Continuous Fiber Sheet Adhesion" of the Japan Highway Public Corporation Test and Research Standards.

Comparative Example 4

An epoxy resin-based surface preparation material containing cement mortar (trade name: ToughGuard E-W Filler, Nippon Paint Co., Ltd.) was coated at a coated amount of 1.0 kg/m² with a trowel instead of the one-component liquid urethane-based resin solvent-based primer (Auto Chemical Ind. Co., Ltd., trade name: OP-2531) used in Example 5 and cured for 16 hours at 20° C., followed by further coating a wet-curing urethane resin-based primer (trade name: ToughGuard R-M Primer, Nippon Paint Co., Ltd.) at a coated amount of 0.15 kg/m² and curing for 2 hours at 20° C. Next, without using the triaxial Vinylon mesh manufactured by Nitto Boseki Co., Ltd., and instead of using the clear one-component type polyurethane resin composition for preventing detachment of concrete pieces and tiles of Example 2, a Component A composed of 97 parts by weight of Mitseron B-500 Gray Coating (manufactured by Mitsui Metal Paint Chemical Co., Ltd., coating liquid containing 54 parts by weight of polyol component having a hydroxyl group equivalent of 625 g/eq and an average number of functional groups of 2.7, 40 parts by weight of pigment containing titanium dioxide, silicon dioxide, mica and carbon black, and 3 parts by weight of additive, solid content: 100%) and 20 parts by weight of titanium dioxide, and 33 parts by weight of a Component B containing Mitseron A-5000 Curing Agent (polyisocyanate manufactured by Mitsui Metal Paint Chemical Co., Ltd., isocyanate group equivalent: 135, average number of functional groups: 2.7, solid content: 100%) were mixed and stirred for 1 minute under conditions of 1,500 rpm with a desktop disperser followed by use of the resulting composition. This composition was then coated at a coated amount of 1.4 kg/m² (average film thickness: 1.4 mm) with a trowel and cured for 3 hours. Moreover, a urethane-based resin top coat (trade name: ToughGuard UD Top Coat, Nippon Paint Co., Ltd.) was coated at a coated amount of 0.12 kg/m² with a trowel and cured for 7 days at 20° C. A push-out test was then carried out in the same manner as Example 5 with respect to other conditions. As a result, cracking occurred in the resin film at a displacement up to 10 mm, and the criteria were unable to be satisfied.

The results obtained in Examples 5 and 6 and Comparative Example 4 are shown in Table 2.

TABLE 2

| Raw material composition (g) | Example 5 Using Mesh | Example 6 | Comparative Example 4 |
|---|---|---|---|
| Isocyanate group-containing urethane prepolymer P-2 (ratio of urethane prepolymer resin: 100%) | 130.0 | 130.0 | Mitsui Metal Paint Chemical, two-component liquid urethane coating (gray) |
| Solvent | 2.0 | 2.0 | |
| Hindered amine antioxidant | 1.0 | 1.0 | |
| Hindered phenol antioxidant | 1.0 | 1.0 | |
| Urethane bisoxazolidine | 13.7 | 13.7 | |
| Thixotropy-imparting agent | 11.8 | 11.8 | |
| Push-out test | Excellent | Excellent | Poor |

INDUSTRIAL APPLICABILITY

The one-component type polyurethane resin composition for reducing or preventing detachment of concrete pieces and tiles of the present disclosure can be applied easily with a trowel or brush, can be applied to vertical surfaces without running, has superior coating workability, is not dispersed to surrounding areas during application, cures rapidly, is able to form a transparent, high-strength resin coated film or high-strength resin coated film after reactive curing, and is able to prevent detachment of concrete pieces and tiles due to this high-strength resin coated film.

In addition, as a result of being able to form a high-strength resin coated film having superior weather resistance without applying a top coat, diagnosis of deterioration of concrete can be facilitated by being carried out visually during maintenance of concrete structures in the case of a transparent, high-strength resin coated film, the existing appearance of the tiled exteriors of buildings and other structures can be maintained, and in comparison with comparative methods using a synthetic resin coated film or continuous fiber sheet composed of glass fibers and the like, work efficiency can be improved and construction time can be shortened, a high level of expertise and skill is not required, and cost reductions can be achieved.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A one-component polyurethane resin composition for reducing or preventing detachment of concrete pieces and tiles, comprising: an isocyanate group-containing urethane prepolymer (A), a thixotropy-imparting agent (B) consisting of a fine powdered silica, and a compound (C) containing a group that regenerates an active hydrogen group by being hydrolyzed by moisture,
   wherein the isocyanate group-containing urethane prepolymer (A) is obtained by reacting polyisocyanate with at least one active hydrogen group-containing compound, under conditions such that isocyanate groups are in excess with respect to the total active hydrogen groups or hydroxyl groups and active hydrogen groups,
   wherein the thixotropic-imparting agent (B) is for reducing or preventing running after coating of the composition,
   wherein the compound (C) containing a group that regenerates an active hydrogen group by being hydrolyzed by moisture is a compound that has an oxazolidine ring, and
   wherein the one-component polyurethane resin composition is for forming a transparent resin coated film.

2. The one-component polyurethane resin composition for reducing or preventing detachment of concrete pieces and tiles according to claim 1, further comprising a solvent (D) and a weather resistance stabilizer (E).

3. The one-component polyurethane resin composition for reducing or preventing detachment of concrete pieces and tiles according to claim 1, wherein the isocyanate group-containing urethane prepolymer (A) is obtained from at least one of polyisocyanate selected from the group consisting of aliphatic polyisocyanates, alicyclic polyisocyanates and aromatic-aliphatic polyisocyanates.

4. The one-component polyurethane resin composition for reducing or preventing detachment of concrete pieces and tiles according to claim 1, wherein the at least one active hydrogen group-containing compound is selected from the group consisting of high molecular weight polyols, low molecular weight polyols, and compounds having at least one each of an active hydrogen group and photocurable ethylenic unsaturated group.

5. The one-component polyurethane resin composition for reducing or preventing detachment of concrete pieces and tiles according to claim 1, wherein the thixotropy-imparting agent (B) is present in an amount of 1 part by weight to 200 parts by weight, based on a value of 100 parts by weight of the isocyanate group-containing urethane prepolymer (A).

6. The one-component polyurethane resin composition for reducing or preventing detachment of concrete pieces and tiles according to claim 1, further comprising a hydrolysis catalyst of an oxazolidine ring in an amount of 0.001 parts by weight to 10 parts by weight, to 100 parts by weight of the isocyanate group-containing urethane prepolymer (A).

7. The one-component polyurethane resin composition for reducing or preventing detachment of concrete pieces and tiles according to claim 1, wherein a ratio of a viscosity value at 10 rpm of the composition/a viscosity value at 100 rpm of the composition, measured at 25° C., is 4.0 or more.

8. The one-component polyurethane resin composition for reducing or preventing detachment of concrete pieces and tiles according to claim 1, wherein the composition is a paste.

9. The one-component polyurethane resin composition for reducing or preventing detachment of concrete pieces and tiles according to claim 1, wherein an isocyanate group content of the isocyanate group-containing urethane prepolymer (A) is 0.1% by weight to 15.0% by weight.

10. The one-component polyurethane resin composition for reducing or preventing detachment of concrete pieces and tiles according to claim 1, wherein the amount of the compound (C) containing a group that regenerates an active hydrogen group by being hydrolyzed by moisture, is such that an active hydrogen of secondary amino groups generated by hydrolysis of the compound (C) is 0.3 equivalents or more based on 1.0 equivalents of the isocyanate group in the isocyanate group-containing urethane prepolymer (A).

11. The one-component polyurethane resin composition for reducing or preventing detachment of concrete pieces and tiles according to claim 1, wherein the polyisocyanate and the at least one active hydrogen group-containing compound are the only reactants used in the reaction by which the isocyanate group-containing urethane prepolymer (A) is obtained.

12. A method for reducing or preventing detachment of concrete pieces and tiles by forming a reinforcing layer on a surface of a concrete structure or tiled wall, the method comprising:
   forming a transparent resin coated film by coating a one-component polyurethane resin composition for reducing or preventing detachment of concrete pieces and tiles, the one-component polyurethane resin composition comprising:
   an isocyanate group-containing urethane prepolymer (A), a thixotropy-imparting agent (B) consisting of a fine powdered silica, and a compound (C) containing a group that regenerates an active hydrogen group by being hydrolyzed by moisture,
   wherein the isocyanate group-containing urethane prepolymer (A) is obtained by reacting polyisocvanate with at least one active hydrogen group-containing compound, under conditions such that isocyanate groups are in excess with respect to the total active hydrogen groups or hydroxyl groups and active hydrogen groups,
   wherein the thixotropic-imparting agent (B) is for reducing or preventing running after coating of the composition, and
   wherein the compound (C) containing a group that regenerates an active hydrogen group by being hydrolyzed by moisture is a compound that has an oxazolidine ring.

13. The method according to claim 12, further comprising:
forming a primer layer by coating a primer before coating the one-component polyurethane resin composition for reducing or preventing detachment of concrete pieces and tiles.

14. The method according to claim 13, wherein the primer layer is formed from a urethane resin or an epoxy resin.

15. The method according to claim 12, further comprising:
forming a resin coated film by coating the one-component polyurethane resin composition for reducing or preventing detachment of concrete pieces and tiles after having preliminarily arranged a glass cloth and/or woven fiber mesh, and forming a reinforcing layer in which the glass cloth and/or woven fiber mesh is embedded in the resin coated film.

16. A one-component polyurethane resin composition for reducing or preventing detachment of concrete pieces and tiles, comprising: an isocyanate group-containing urethane prepolymer (A), and a thixotropy-imparting agent (B) consisting of a fine powdered silica,
and wherein the thixotropic-imparting agent (B) is for reducing or preventing running after coating of the composition, and wherein the one-component polyurethane resin composition is for forming a transparent resin coated film,
wherein the composition does not contain a curing acceleration catalyst.

17. An article, comprising:
a concrete structure or tile, and
a coating on a surface of the concrete structure or tile,
wherein the coating comprises a one-component polyurethane resin composition for reducing or preventing detachment of concrete pieces and tiles, the one-component polyurethane resin composition comprising: an isocyanate group-containing urethane prepolymer (A), a thixotropy-imparting agent (B) consisting of a fine powdered silica, and a compound (C) containing a group that regenerates an active hydrogen group by being hydrolyzed by moisture,
wherein the isocyanate group-containing urethane prepolymer (A) is obtained by reacting polyisocyanate with at least one active hydrogen group-containing compound, under conditions such that isocyanate groups are in excess with respect to the total active hydrogen groups or hydroxyl groups and active hydrogen groups,
wherein the thixotropic-imparting agent (B) is for reducing or preventing running after coating of the composition,
wherein the compound (C) containing a group that regenerates an active hydrogen group by being hydrolyzed by moisture is a compound that has an oxazolidine ring, and
wherein the one-component polyurethane resin composition is for forming a transparent resin coated film.

* * * * *